United States Patent
Allan et al.

(10) Patent No.: US 7,589,039 B2
(45) Date of Patent: Sep. 15, 2009

(54) SYNTHETIC SILICA HAVING LOW POLARIZATION-INDUCED BIREFRINGENCE, METHOD OF MAKING SAME AND LITHOGRAPHIC DEVICE COMPRISING SAME

(75) Inventors: Douglas Clippinger Allan, Corning, NY (US); Dana Craig Bookbinder, Corning, NY (US); Ulrich W H Neukirch, Painted Post, NY (US); Charlene Marie Smith, Corning, NY (US)

(73) Assignee: Corning Incorporated, Corning, NY (US)

( * ) Notice: Subject to any disclaimer, the term of this patent is extended or adjusted under 35 U.S.C. 154(b) by 268 days.

(21) Appl. No.: 11/241,075

(22) Filed: Sep. 30, 2005

(65) Prior Publication Data
US 2006/0137399 A1 Jun. 29, 2006

Related U.S. Application Data

(60) Provisional application No. 60/640,726, filed on Dec. 29, 2004, provisional application No. 60/640,696, filed on Dec. 30, 2004, provisional application No. 60/649,860, filed on Feb. 2, 2005, provisional application No. 60/696,106, filed on Jun. 30, 2005.

(51) Int. Cl.
*C03C 3/06* (2006.01)
*C03B 19/00* (2006.01)
(52) U.S. Cl. .......................................... 501/54; 65/17.6
(58) Field of Classification Search .................... 501/54
See application file for complete search history.

(56) References Cited

U.S. PATENT DOCUMENTS

| | | | | |
|---|---|---|---|---|
| 5,086,352 | A | 2/1992 | Yamagata et al. | 359/350 |
| 5,325,230 | A | 6/1994 | Yamagata et al. | 359/350 |
| 5,364,433 | A * | 11/1994 | Nishimura et al. | 65/17.4 |
| 5,410,428 | A | 4/1995 | Yamagata et al. | 359/350 |
| 5,616,159 | A | 4/1997 | Araujo et al. | 65/17.4 |
| 6,143,676 | A * | 11/2000 | Ohashi et al. | 501/54 |
| 6,451,719 | B1 | 9/2002 | Yamagata | |
| 2002/0077244 | A1* | 6/2002 | Borrelli et al. | 501/54 |

(Continued)

FOREIGN PATENT DOCUMENTS

EP      1340722 A1     3/2003

(Continued)

OTHER PUBLICATIONS

Escher, G. C., *KrF Laser Induced Color Centers In Commercial Fused Silicas*, SPIE vol. 998, Excimer Beam Applications, pp. 30-37 (1988).

(Continued)

*Primary Examiner*—Jerry Lorengo
*Assistant Examiner*—Kevin M Johnson
(74) *Attorney, Agent, or Firm*—Robert P. Santandrea; Siwen Chen

(57) ABSTRACT

Disclosed are synthetic silica glass having a low polarization-induced birefringence, process for making the glass and lithography system comprising optical element made of the glass. The silica glass has a polarization-induced birefringence measured at 633 nm of less than about 0.1 nm/cm when subjected to excimer laser pulses at about 193 nm having a fluence of about 40 $\mu J \cdot cm^{-2} \cdot pulse^{-1}$ and a pulse length of about 25 ns for $5 \times 10^9$ pulses.

32 Claims, 11 Drawing Sheets

U.S. PATENT DOCUMENTS

| | | | |
|---|---|---|---|
| 2003/0051507 A1 | 3/2003 | Ikuta et al. | 65/30.1 |
| 2003/0115905 A1 | 6/2003 | Kuhn et al. | 65/17.6 |
| 2003/0195107 A1 | 10/2003 | Ikuta et al. | 501/57 |
| 2005/0217318 A1 | 10/2005 | Kuhn et al. | 65/32.3 |

FOREIGN PATENT DOCUMENTS

| | | |
|---|---|---|
| WO | WO 0229492 | 4/2002 |
| WO | WO2005082800 | 11/2005 |

OTHER PUBLICATIONS

Yamagata, S., *Improvement of Excimer Laser Durability of Silica Glass*, Transactions of the Materials Research Society of Japan, vol. 8, pp. 82-96 (1992).

Faile, S. P., and Roy, D. M., *Mechanism of Color Center Destruction in Hydrogen Impregnated Radiation Resistant Glasses*, Materials Research Bull., vol. 5, pp. 385-390 (1970).

Shelby, J. E., *Radiation Effects in Hydrogen-impregnated Vitreous Silica*, J. Applied Physics, vol. 50, No. 5, pp. 3702-3706 (1979).

C.K. Van Peski et al. reports in Journal of Non-Crystalline Solids 265, 285 (2000).

N.F. Borrelli et al., Applied Physics Letters 80 (2), 219 (2002).

* cited by examiner

SYNTHETIC SILICA HAVING LOW POLARIZATION-INDUCED BIREFRINGENCE, METHOD OF MAKING SAME AND LITHOGRAPHIC DEVICE COMPRISING SAME

CROSS-REFERENCE TO RELATED APPLICATIONS

The present application claims the benefit under 35 U.S.C. § 120 of U.S. patent application Ser. No. 11/148,504 filed on Jun. 8, 2005 entitled "SYNTHETIC SILICA HAVING LOW POLARIZATION-INDUCED BIREFRINGENCE, METHOD OF MAKING SAME AND LITHOGRAPHIC DEVICE COMPRISING SAME," which, in turn, claims benefit under 35 U.S.C. § 119(e) of U.S. provisional patent application No. 60/640,726, filed on Dec. 29, 2004. The present application also claims benefit under 35 U.S.C. § 119(e) of U.S. provisional patent application Ser. Nos. (i) 60/640,696, filed on Dec. 30, 2004; (ii) 60/649,860, filed on Feb. 2, 2005; and (iii) 60/696,106, filed on Jun. 30, 2005, the contents of which are all relied upon and incorporated herein by reference in their entirety.

FIELD OF THE INVENTION

The present invention relates to synthetic silica material, process for making the same and optical systems comprising optical elements made from such material. In particular, the present invention relates to synthetic silica material having low polarization-induced birefringence when exposed to elliptically or linearly polarized UV irradiation and method of making the same, as well as optical systems comprising optical elements made from such silica material. The present invention is useful, for example, in the production of synthetic silica glass material for use in UV lithography systems, especially immersion lithography systems in which linearly polarized irradiation is employed.

BACKGROUND OF THE INVENTION

As practiced commercially, fused silica optical members such as lenses, prisms, filters, photomasks, reflectors, etalon plates and windows, have been manufactured from bulk pieces of fused silica made in large production furnaces. Bulk pieces of fused silica manufactured in large production furnaces are known in the art as boules or ingots. Blanks are cut from boules or ingots, and finished optical members are manufactured from glass blanks, utilizing manufacturing steps that may include, but are not limited to, cutting, polishing, and/or coating pieces of glass from a blank. Many of these optical members are used in various apparatus employed in environments where they are exposed to ultraviolet light having a wavelength of about 360 nm or less, for example, an excimer laser beam or some other ultraviolet laser beam. The optical members are incorporated into a variety of instruments, including lithographic laser exposure equipment for producing highly integrated circuits, laser fabrication equipment, medical equipment, nuclear fusion equipment, or some other apparatus which uses a high-power ultraviolet laser beam.

As the photon energy, pulse energy and pulse rate of lasers increase, the optical members which are used in conjunction with such lasers are exposed to increased levels of energy. Fused silica has become widely used as the material of choice for optical members in such laser-based optical systems due to their excellent optical properties and resistance to laser induced damage.

Laser technology has advanced into the short wavelength, high energy ultraviolet spectral region, the effect of which is an increase in the frequency (decrease in wavelength) of light produced by lasers. Of particular interest are short wavelength lasers operating in the UV and deep UV (DUV) and vacuum UV wavelength ranges, which include, but are not limited to, lasers operating at about 248 nm, 193 nm, 157 nm and even shorter wavelengths. Excimer laser systems are popular in microlithography applications, and the shortened wavelengths allow for increased feature resolution and thus line densities in the manufacturing of integrated circuits and microchips, which enables the manufacture of circuits having decreased feature sizes. A direct physical consequence of shorter wavelengths (higher frequencies) is higher photon energies. In such optical systems, fused silica optics are exposed to high irradiation levels for prolonged periods of time, and this may result in the degradation of the optical properties of the optical members.

It is known that such laser induced degradation adversely affects the optical properties and performance of the fused silica optics by decreasing light transmission levels, discoloring the glass, altering the index of refraction, altering the density, and increasing absorption levels of the glass. Over the years, many methods have been suggested for improving the optical damage resistance of fused silica glass. It has been generally known that high purity fused silica prepared by such methods as flame hydrolysis, CVD-soot remelting process, plasma CVD process, electrical fusing of quartz crystal powder, and other methods, is susceptible to laser damage to various degrees.

A common suggestion has been to increase the OH content of such glass to a high level. For example, Escher, G. C., *KrF Laser Induced Color Centers In Commercial Fused Silicas*, SPIE Vol. 998, Excimer Beam Applications, pp. 30-37 (1988), confirms that defect generation rate is dependent upon the fused silica OH content, and that "wet" silica is the material of choice for KrF applications. Specifically, they note that high OH content silica is more damage resistant than low OH silica.

U.S. Pat. No. 5,086,352 and the related U.S. Pat. No. 5,325,230 has also disclosed that the ability to resist optical deterioration from exposure to a short wavelength ultraviolet laser beam depends on the OH group content in the presence of hydrogen. Specifically, these references show that for high purity silica glass having low OH content, KrF excimer laser durability is poor. Thus, they suggest an OH content of at least 50 ppm. Similarly, Yamagata, S., *Improvement of Excimer Laser Durability of Silica Glass*, Transactions of the Materials Research Society of Japan, Vol. 8, pp. 82-96 (1992), discloses the effect of dissolved hydrogen on fluorescence emission behavior and the degradation of transmission under irradiation of KrF excimer laser ray for high purity silica glass containing OH groups up to 750 ppm by weight such as those synthesized from high purity silicon tetrachloride by the oxygen flame hydrolysis method.

Others have also suggested methods of increasing the optical durability of fused silica. For example, Faile, S. P., and Roy, D. M., *Mechanism of Color Center Destruction in Hydrogen Impregnated Radiation Resistant Glasses*, Materials Research Bull., Vol. 5, pp. 385-390 (1970), have disclosed that hydrogen-impregnated glasses tend to resist gamma ray-induced radiation damage. Japanese Patent Abstract 40-10228 discloses a process by which a quartz glass article made by melting is heated at about 400 to 1000° C. in an atmosphere containing hydrogen to prevent colorization due to the influence of ionizing radiation (solarization). Similarly, Japanese Patent Abstract 39-23850 discloses that the transmittance of UV light by silica glass can be improved by heat treating the glass in a hydrogen atmosphere at 950 to 1400° C. followed by heat treatment in an oxygen atmosphere at the same temperature range.

Shelby, J. E., *Radiation Effects in Hydrogen-impregnated Vitreous Silica*, J. Applied Physics, Vol. 50, No. 5, pp. 3702-06 (1979), suggests that irradiation of hydrogen-impregnated vitreous silica suppresses the formation of optical defects, but that hydrogen impregnation also results in the formation of large quantities of bound hydroxyl and hydride, and also results in a change in density of the glass.

Recently, U.S. Pat. No. 5,410,428 has disclosed a method of preventing induced optical degradation by a complicated combination of treatment processes and compositional manipulations of the fused silica members to achieve a particular hydrogen concentration and refractive index, in order to improve resistance to UV laser light degradation. It is suggested that under such UV irradiation some chemical bonds between silicon and oxygen in the network structure of the fused silica is generally broken and then rejoins with other structures resulting in an increased local density and an increased local refractive index of the fused silica at the target area.

More recently, U.S. Pat. No. 5,616,159 to Araujo et al. disclosed a high purity fused silica having high resistance to optical damage up to $10^7$ pulses (350 mJ/cm$^2$/pulse) at the laser wavelength of 248 nm and a method for making such glass. The composition disclosed in Araujo et al. comprises at least 50 ppm OH and has a concentration of $H_2$ greater than $1\times10^{18}$ molecules/cm$^3$.

It has been reported that when silica glass is exposed to non-polarized or circularly polarized UV laser beam, usually in the peripheral area of the exposure light beam, additional birefringence (induced edge birefringence) is generated due to strain caused by laser damage, but in the center area of the light beam, there is usually negligible induced birefringence. Recently, a new phenomenon of laser damage to silica material has been observed: when the silica glass is exposed to linearly polarized deep UV laser beam, in addition to the induced edge birefringence, additional birefringence is induced in the center of the exposed area of the glass ("polarization-induced birefringence"). The induced birefringence, especially polarization-induced birefringence, is of particular concern to immersion lithography systems where a liquid fills the gap between the last lens element and the wafer in order to enlarge the numerical aperture of the lens system. In such immersion lithography systems, the polarization state of the UV radiation needs to be controlled, desirably linearly polarized. The induced birefringence in the glass alters the polarization state of the UV radiation, causing reduction of phase contrast and system resolution. Therefore, for deep UV and vacuum UV immersion lithographic systems, it is highly desirable that the glass material used in making the lens elements has low induced birefringence damage, especially a low polarization-induced birefringence, when exposed to linearly or elliptically polarized UV radiation, in addition to low laser-induced wave-front distortion ("LIWFD") and high transmission.

C. K. Van Peski et al. reports in Journal of Non-Crystalline Solids 265, 285 (2000) the experimental observation of the polarization-induced birefringence effect within a SEMATECH study in which fused silica of several suppliers was exposed and measured. The publication does not disclose any details about the samples other than the measured damage. N. F. Borrelli et al., Applied Physics Letters 80 (2), 219 (2002) reports observation of the effect in different types of fused silica made via the so-called direct glass process. Here, polarization-induced birefringence was shown to occur in samples exhibiting retarded wavefront in the damaged area (then called compaction) as well as in samples exhibiting advanced wavefront in the damaged area (then called expansion). An explanation of polarization-induced birefringence in terms of anisotropic density change is introduced. European patent application EP1340722A1 discloses polarization-induced birefringence levels for several glasses of different compositions made by using the soot-to-glass process. Those glasses were loaded with molecular hydrogen during consolidation of the soot. These references do not teach high purity synthetic silica material with a low level of polarization-induced birefringence and method of making the same.

Therefore, there exists a need for a synthetic silica material having a low level of polarization-induced birefringence and method of making the same. The present invention satisfies this need.

SUMMARY OF THE INVENTION

According to a first aspect of the present invention, it is provided a synthetic silica glass material capable of being used in photolithography below about 300 nm having less than about 1 nm/cm, advantageously less than about 0.4 nm/cm, more advantageously less than about 0.1 nm/cm of polarization-induced birefringence measured at about 633 nm after being subjected to $5\times10^9$, preferably $1\times10^{10}$, more preferably $2\times10^{10}$, still more preferably $5\times10^{10}$ pulses, most preferably $1\times10^{11}$ pulses of linearly polarized pulsed laser beam at about 193 nm having a fluence of about 40 $\mu J\cdot cm^{-2}\cdot pulse^{-1}$ and a pulse length of about 25 ns. In certain embodiments, the synthetic silica glass material of the present invention has less than about 0.04 nm/cm of polarization-induced birefringence measured at about 633 nm after being subjected to $2\times10^{10}$ pulses of linearly polarized pulsed laser beam at about 193 nm having a fluence of about 40 $\mu J\cdot cm^{-1}\cdot pulse^{-1}$ and a pulse length of about 25 ns. In certain other embodiments, the synthetic silica glass material of the present invention has a polarization-induced birefringence value measured at 633 nm, lower than 1 nm/cm, advantageously lower than 0.4 nm/cm, more advantageously lower than 0.1 nm/cm after being subjected to $5\times10^9$ pulses of linearly polarized pulsed laser beam at about 193 nm having a fluence of about 40 $\mu J\cdot cm^{-2}\cdot pulse^{-1}$ and a pulse length of about 25 ns, but higher than about 0.01 nm/cm (in certain embodiments higher than about 0.04 nm/cm) after being subjected to $2\times10^{10}$ pulses of linearly polarized pulsed laser beam at about 193 nm having a fluence of about 40 $\mu J\cdot cm^{-2}\cdot pulse^{-1}$ and a pulse length of about 25 ns. Advantageously, when exposed to linearly polarized UV pulsed laser irradiation, the silica glass material of the present invention has a polarization-induced birefringence (PIB) approximately linearly dependent on the number (N) and fluence (F) of the pulses at a given pulse length before saturation of polarization-induced birefringence.

Thus, according to a second aspect of the present invention, it is provided a synthetic silica material having a polarization-induced birefringence (PIB) approximately linearly dependent on the number (N) and fluence (F) of the pulses at a given pulse length before saturation of polarization-induced birefringence, i.e., PIB(M)=a·N·F, where PIB(M) is measured polarization-induced birefringence at about 633 nm, N is the pulse number in the million, and F is fluence of the laser light beam, and a is a constant. Preferably, when the laser pulse has a wavelength of approximately 193 nm and a pulse length of about 25 ns, the constant a of the silica glass material of the present invention, measured at about 633 nm, is less than about $5\times10^{-7} cm^2\cdot \mu J^{-1}$, more preferably less than about 2.5×

$10^{-7}$ cm²·µJ⁻¹, still more preferably less than about 1.25× $10^{-7}$ cm²·µJ⁻¹, and most preferably less than about 5×10⁻⁸ cm²·µJ⁻¹.

According to another aspect of the present invention, it is provided a silica glass having a normalized PIB ("PIB(N)", see later definition) when subjected to excimer laser at about 193 nm, measured at about 633 nm, of less than 10, advantageously less than 8, more advantageously less than 5, most advantageously less than 2.

Preferably, the silica glass material of the present invention has an OH concentration of less than about 500 ppm by weight, preferably less than 300 ppm by weight, more preferably less than 100 ppm by weight, still more preferably less than 50 ppm, most preferably less than 20 ppm by weight.

Preferably, the silica glass material of the present invention has an initial birefringence before being exposed to linearly polarized UV irradiation of less than 1 nm/cm measured at about 633 nm, more preferably less than about 0.5 nm/cm, most preferably less than about 0.1 nm/cm.

Preferably, the silica glass material of the present invention has an induced edge birefringence of less than about 0.5 nm/cm measured at about 633 nm, preferably less than 0.1 nm/cm, after being subjected to 5×10¹⁰, preferably 1×10¹¹, more preferably 2×10¹¹ pulses of linearly polarized pulsed laser beam at about 193 nm having a fluence of about 40µJ·cm⁻²·pulse⁻¹ and a pulse length of about 25 ns.

Preferably, the synthetic silica glass of the present invention comprises less than 50 ppm of Cl.

According to another aspect of the present invention, it is provided a method for producing a synthetic silica glass material capable of being used in photolithography below about 300 nm having a low level of polarization-induced birefringence upon exposure to linearly polarized irradiation at about 193 nm, comprising the following steps:

(i) providing a high purity consolidated synthetic silica glass material having OH concentration of less than about 500 ppm by weight, preferably less than 300 ppm by weight, more preferably less than 100 ppm, still more preferably less than 50 ppm, most preferably less than 20 ppm by weight; and (ii) treating the consolidated synthetic silica glass in the presence of $H_2$ at a temperature below 800° C., preferably over about 300° C., more preferably at about 500° C., at least if the consolidated glass obtained immediately after step (i) has an $H_2$ concentration of less than 1×10¹⁶ molecules/cm³.

According to a preferred embodiment of the process of the present invention, in step (i), the high purity consolidated synthetic silica glass material is formed by using a soot-to-glass process.

In a preferred embodiment of the process of the present invention, step (i) comprises the following steps:

(A) forming a silica soot preform;

(B) drying the silica soot preform with a drying agent; and (C) consolidate the dried silica soot preform in the presence of an atmosphere containing $H_2O$ at a controlled partial pressure thereof.

Preferably, in step (B), the drying agent is selected from $F_2$, $Cl_2$, $Br_2$, halogen-containing compounds, CO, $CO_2$ and compatible mixtures thereof Preferably, immediately after drying in step (B), the OH concentration in the soot preform is less than about 0.1 ppm by weight. Preferably, immediately after step (C), the OH concentration in the consolidated glass is less than or equal to 150 ppm by weight. In one embodiment of this process, in step (C), the atmosphere in which the soot preform is consolidated further comprises $O_2$. In another embodiment of this process, in step (C), the atmosphere in which the soot preform is consolidated further comprises $H_2$.

In another preferred embodiment of the process of the present invention, step (i) comprises the following steps:

(A1) forming a silica soot preform; and (B1) drying the silica soot preform with a dry inert gas at an elevated temperature to an OH concentration of over about 20 ppm by weight.

According to another preferred embodiment of the process of the present invention, prior to step (ii), the consolidated glass has a $H_2$ concentration of less than or equal to about 1×10¹⁶ molecules/cm³.

According to a third aspect of the present invention, it is provided an immersion lithographic system comprising at least one lens element exposed to UV irradiation made of the silica glass material of the present invention generally described above. The lithographic irradiation employed in the lithographic system is preferably elliptically or linearly polarized, more preferably linearly polarized. Preferably, the lithographic irradiation has a wavelength of about 248 nm or 193 nm.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

BRIEF DESCRIPTION OF THE DRAWINGS

In the accompanying drawings.

DETAILED DESCRIPTION OF THE INVENTION

Figure 1:
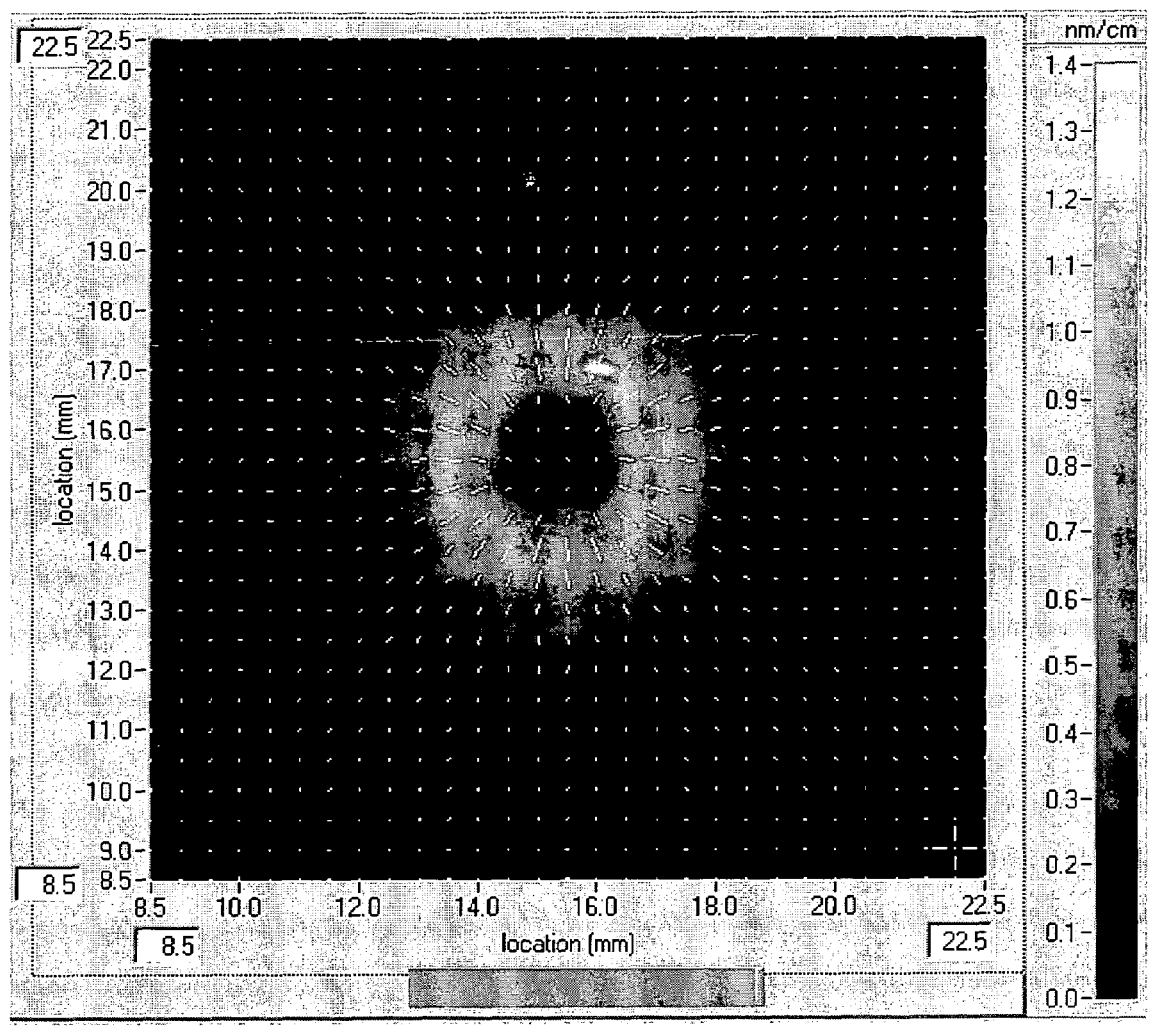
FIG. 1 is a two-dimensional birefringence map of a synthetic silica glass sample exposed to a circularly polarized excimer laser beam at about 193 nm, measured at about 633 nm.

As used herein, the term "polarization-induced birefringence" means the peak measured birefringence level in the center portion of the uniformly exposed area of the glass after a certain time interval or laser pulses, if a pulsed laser beam is used, less the initial birefringence of the glass before the exposure. In the present application, when exposing the glass to quantify the polarization-induced birefringence level of the silica glass, a linearly polarized pulsed laser beam at approximately 193 nm having about 3 mm diameter with a given fluence and pulse length is directed to a fixed area of the glass sample. The birefringence at the center portion of the exposed area is measured after a certain number of pulses. The polarization-induced birefringence value is calculated by subtracting the initial birefringence of the glass from the measured center birefringence.

As used herein, the term "induced edge birefringence" means the measured peak birefringence level in the peripheral portion outside of but abutting the exposed area (i.e., the area right at the aperture where the light intensity changes from nominal value to zero) of the glass after a certain time interval or laser pulses, if a pulsed laser beam is used, less the initial birefringence of the glass before the exposure. In the present application, the induced edge birefringence of the silica glass is measured after a linearly polarized pulsed laser beam at approximately 193 nm having about 3 mm diameter with a given fluence and pulse length has been directed to a fixed area of the glass sample for a certain period of time or a given number of pulses. The induced edge birefringence value is calculated by subtracting the initial birefringence of the glass from the peak measured birefringence at the peripheral portion.

As used herein, "low polarization-induced birefringence" means a polarization-induced birefringence of less than or equal to 0.1 nm/cm measured at about 633 nm after being subjected to 5×10⁹ pulses of linearly polarized pulsed laser beam at about 193 nm having a fluence of about 40 μJ·cm⁻²·pulse⁻¹ and a pulse length of about 25 ns.

As used herein, "normalized polarization-induced birefringence" is calculated from the measured polarization-induced birefringence as follows:

$$PIB(N) = \frac{PIB(M)}{N \cdot F} \times 14,$$

where PIB(N) is normalized polarization-induced birefringence, PIB(M) is measured polarization-induced birefringence in nm/cm measured at about 633 nm, N is number of pulses in billion pulses, F is fluence of the ArF laser to which the glass is exposed to in mJ·cm⁻²·pulse⁻¹. For example, for a glass sample exposed to ArF laser with a fluence of 40 μJ·cm⁻²·pulse⁻¹ for 5×10¹⁰ pulses having a resultant measured PIB(M) of 0.2 nm/cm, its PIB(N) is calculated as follows:

$$PIB(N) = \frac{PIB(M)}{N \cdot F} \times 14 = \frac{0.2}{50 \cdot 0.04} \times 14 = 1.4.$$

A single sample may have differing PIB(N) when measured at differing N and F. Thus PIB(N) reported or described in the present application are average values thereof.

The present inventors have found that the polarization-induced birefringence level of silica glass is dependent on the composition of the glass and the processing conditions thereof. In light of such findings, the inventors have prepared silica materials having low polarization-induced birefringence level and invented the processes for making silica glass with a low level of polarization-induced birefringence.

As regards the composition of the silica glass, the present inventors have found that, among others, OH concentration in the glass is a major factor affecting the polarization-induced birefringence of the glass. Generally, all other conditions remaining equal, the higher the OH level, the higher the polarization-induced birefringence of the glass. Thus, the present inventors have found that, to achieve a low level of polarization-induced birefringence in the silica glass, it is desired that the OH concentration in the glass is less than 500 ppm by weight, preferably less than 300 ppm, more preferably less than 100 ppm, still more preferably less than 50 ppm, most preferably less than 20 ppm.

To a lesser extent, the H₂ level of the silica glass affects the polarization-induced birefringence level as well. For a low polarization-induced birefringence, it is desired that the silica glass comprises H₂ from 1×10¹⁶ to 1×10¹⁹ molecules/cm³, preferably less than about 5.0×10¹⁷ molecules/cm³, and more preferably less than about 2.0×10¹⁷ molecules/cm³.

To achieve a low level of polarization-induced birefringence, it is desired the silica glass comprises a low level of contaminants, especially metals, such as alkali, alkaline earth and transition metals. If the glass is to be used in lithography systems, especially those operating in deep and vacuum UV regions, it is highly desirable that the glass comprises less than 10 ppb alkali, alkaline earth, or transition metal elements. More preferably, the synthetic silica glass material of the present invention comprises less than 1 ppb alkaline earth or transition metal elements. It is also desired that the synthetic silica glass comprises less than about 50 ppm by weight of Cl.

As observed in experiments and described below, the synthetic silica glass of the present invention has a very low polarization-induced birefringence damage when exposed to irradiation at 193 nm. It is expected that it should have a very low polarization-induced birefringence at longer wavelength, such as 248 nm as well. Therefore, the silica glass of the present application can be advantageously used in making optical elements used in immersion lithography devices operating in deep and vacuum UV regions, such as at about 248 nm and 193 nm, where the lithographic irradiation is usually elliptically polarized or linearly polarized.

However, the silica glass of the present invention is not limited for use in those applications. The glass of the present invention may be used, for example, for optical elements of dry lithography devices operating in deep or vacuum UV region and longer wavelength. The silica glass of the present application may find applications in other devices where high purity synthetic fused silica glass typically finds use.

The process of the present invention for making high purity synthetic silica glass with a low polarization-induced birefringence level comprises a step (i) of providing a consolidated synthetic silica glass having a relatively low level of OH concentration. As used herein, "low level of OH concentration" means the measured OH concentration by weight of the glass is less than 500 ppm by weight, preferably less than 300 ppm, more preferably less than 200 ppm, still more preferably less than 100 ppm, still more preferably less than 50 ppm, most preferably less than 20 ppm.

To that end, the synthetic silica glass may be produced by using soot-to-glass processes, wherein a porous silica soot preform is first formed by, for example, outside vapor deposition ("OVD"), inside vapor deposition ("IVD") or vapor axial deposition ("VAD"), and the like, and subsequently consolidated to transparent silica glass. Alternatively, the glass may be produced by the direct process, wherein silica soot particles are directly formed into transparent glass without the intermediate step of forming a porous preform thereof. Various silicon precursor compounds, such as silicon halides, organosilicon compounds, may be employed to produce the desired glass in these processes. These processes may be plasma-assisted.

In a preferred embodiment of the process of the present invention, the consolidated silica glass with a low level of OH concentration is formed by the soot-to-glass process. This process is preferred because of the ease of controlling the composition and property of the glass, such as impurities, OH concentration, $H_2$ concentration, fictive temperature, and the like.

Copending, co-assigned U.S. patent application Ser. Nos. 11/064,341, 11/148,504 and 11/148,764 describe soot-to-glass processes for making synthetic silica material having certain composition and transmission, laser damage and refractive index properties, the relevant parts thereof are incorporated herein by reference.

In a soot-to-glass process, if the soot preform is formed in an atmosphere having high partial pressure of water, the soot preform immediately formed usually contains a high level of OH concentration. To reduce the OH concentration of the final consolidated glass, the soot preform needs to be dried prior to consolidation thereof. It has been found that to produce glass with OH concentration over about 50 ppm, the soot preform may be simply placed in helium or other inert gas, such as nitrogen, argon and the like, at elevated temperatures in order to reduce the OH in the soot before sintering it to dense glass. However, to achieve a low OH concentration, such as below 50 ppm by weight, it is preferred that a drying agent is used. The preferred drying agents include, but are not limited to, $CO_2$, CO, chlorine ($Cl_2$), bromine ($Br_2$) and halogen-containing compounds such as, but not limited to, $CF_xCl_yBr_z$ where x, y and z are non-negative integers, $x \leq 4$, $y \leq 4$, $z \leq 4$ and $x+y+z=4$, and compatible mixtures thereof. It is preferred, such as for applications in deep UV and vacuum UV lithography, that the final, consolidated silica glass have little to no (<50 ppm by weight) Cl because of UV damage and transmission problems. So in this preferred embodiment, if $Cl_2$ or Cl-containing compounds are used to dry the silica soot preform, it is important to remove the residual Cl from the $SiO_2$ soot prior to consolidating to dense glass. The drying agent is capable of reducing the OH concentration in the soot to <0.001 to 0.1 ppm by weight (seen after by sintering the soot to dense glass in dry He then analyzing the glass). To achieve the desired level of OH in the consolidated silica glass and to remove the residual Cl, if necessary, the thus-dried silica soot preform may be consolidated in an atmosphere containing $H_2O$. By controlling the partial pressure of the $H_2O$ in the consolidation atmosphere and the thermal history of the consolidation process, OH concentration and distribution thereof in the final, consolidated glass may be controlled at the desired level. Regardless of whether the soot preform is consolidated in the presence of $H_2O$ or not, oxygen may be used in the consolidation atmosphere to remove or re-oxidize any oxygen deficient silica species that may have been created. The soot preform may be consolidated in the presence of $H_2$ as well.

It is preferred that the consolidated glass is further subject to a heat treatment in the presence of $H_2$ for an effective period of time so that the $H_2$ concentration in the final glass reaches a desired level. The $H_2$ concentration in the final glass as well as the temperature at which the $H_2$ treatment is undergone affect the polarization-induced birefringence level and behavior of the final glass as well. It has been found that $H_2$ treatment at a temperature below 800° C. is preferred for a low polarization-induced birefringence value especially for glasses having OH less than about 100 ppm by weight. However, to expedite the $H_2$ treatment process, it is desired that the treatment temperature is at least 300° C.

The following non-limiting examples are presented for the purpose of illustrating the present invention as claimed, and shall not be interpreted to limit the claimed invention in any way.

EXAMPLES

Experimental Procedures and Data

Sample Preparation

Fused silica glass was made using both the so-called direct-to-glass as well as the soot-to-glass processes. For the latter, silica particles are deposited on a substrate which results in a soot blank. In a second step, this blank is consolidated to a solid glass blank. The OH (or water) content of the glass is controlled during consolidation. In a third step, near-net-shape pieces of the glass blank are loaded with molecular hydrogen at elevated temperatures to various target concentrations.

Exposure and Measurements

The bar-shaped fused silica samples were exposed using light from an ArF excimer laser running at a repetition rate of 4000 Hz. The pulse length was about 25 ns. The beam diameter was 3 mm, imposed by an aperture, and its shape was approximately top-hat. The light beam was rendered polarized where necessary by using commercially available linear polarizer or circular polarizer where applicable. Typical sample size was 20×25×100 $mm^3$ and the exposing beam, polarized or not as desired, was directed through the center of the sample parallel to the long axis. The samples were taken off the exposure setup about every 4 billion pulses and birefringence was mapped at a wavelength of 633 nm using a commercial birefringence measurement system. In addition, wavefront distortion was measured in 633 nm and 193 nm interferometers.

Experimental Data

FIG. 1 shows the two-dimensional birefringence map of a sample glass exposed to a circularly polarized light beam. As in other two-dimensional birefringence maps in this application, the birefringence magnitude is grey-scale coded as shown on the right hand side of the map. The white lines indicate the direction of the slow axis of the glass in that particular location. Their length also codes the magnitude. This map shows high induced edge birefringence, yet the polarization-induced birefringence in the center portion of the exposed area is near zero.

Figure 2:
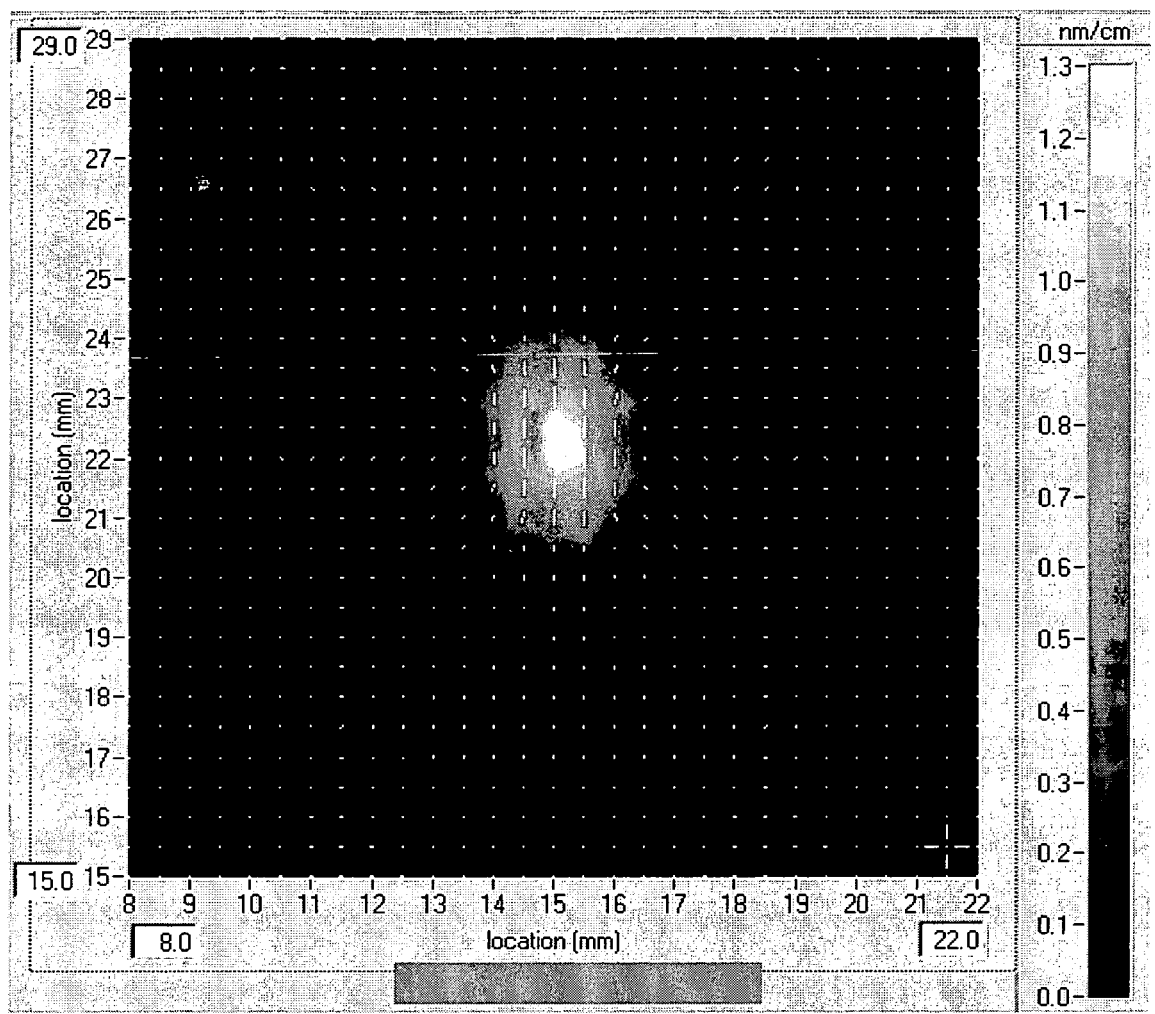
FIG. 2 is a two-dimensional birefringence map of a synthetic silica glass sample exposed to a linearly polarized excimer laser beam at about 193 nm, measured at about 633 nm.
Figure 3:
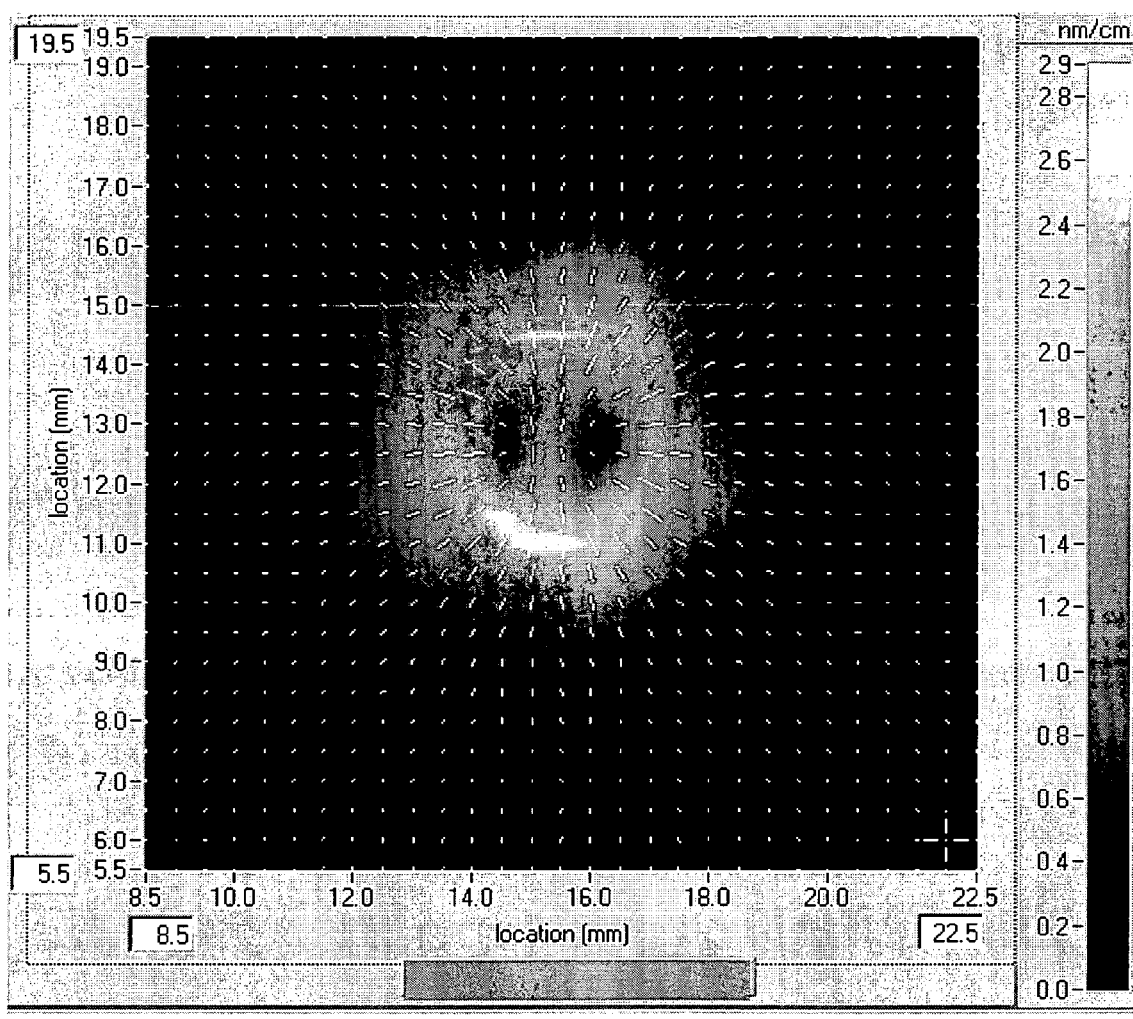
FIG. 3 is a two-dimensional birefringence map of another synthetic silica glass sample exposed to a linearly polarized excimer laser beam at about 193 nm, measured at about 633 nm.

FIG. 2 shows an extreme example of linearly-polarized light beam exposed sample insofar as it barely has (on the scale chosen there) any birefringence outside of the exposed area. It has been chosen to demonstrate the effect as clearly as possible. More often however, for example, in FIG. 3, we observe linear exposure patterns like the one depicted in FIG. 2 where the birefringence outside of the exposure area is similar to that of FIG. 1 with some center birefringence added. These two examples of FIGS. 2 and 3 show that the ratio between the polarization-induced birefringence in the center of the exposure spot and the induced edge birefringence—observed in the unexposed glass surrounding the exposure area—can vary substantially. It has also been observed that the level of polarization-induced birefringence decreases with continued exposure if the polarization is switched midway to the orthogonal polarization. This is consistent with expectation for strain-optical response from anisotropic strain correlated with the direction of linear polarization, described below.

Figure 4:
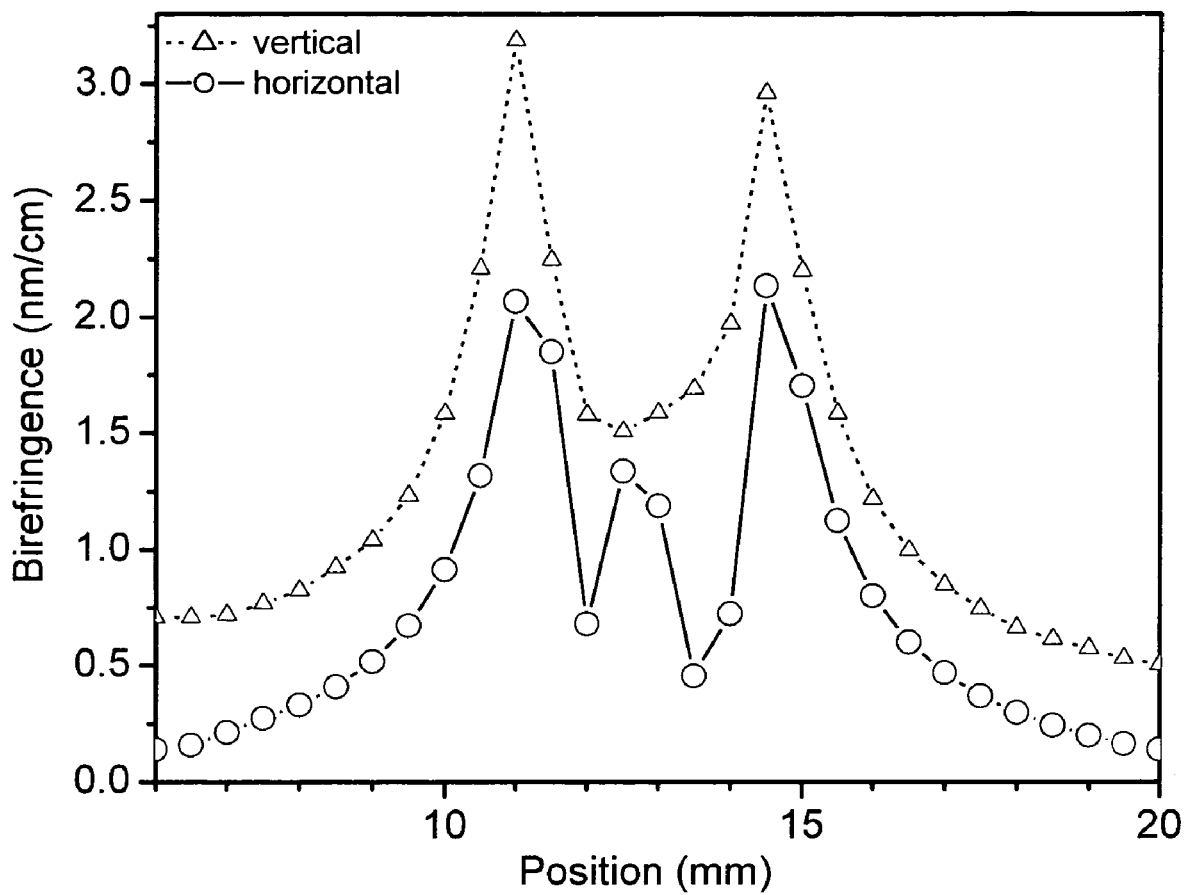
FIG. 4 is a diagram showing the vertical cross-section (x=15.5 mm) and horizontal cross-section (y=13 mm) through the birefringence map of FIG. 3 where the vertical cross-section is shifted upward for 0.4 nm/cm from the actual curve.

FIG. 3 shows a two-dimensional birefringence map of another sample exposed to linearly polarized light beam. FIG. 4 shows the vertical cross-section (x=15.5 mm) and horizontal cross-section (y=13 mm) through the birefringence map of FIG. 3. For the purpose of clarity of illustration, the birefringence values of the vertical cross-section are shifted upward by 0.4 nm/cm. Due to the symmetry, the direction of the slow axis on the vertical cross-section does not change direction at all. So the only obvious difference from a circular exposure is the non-zero value at the center of the exposure spot. In the horizontal direction the slow birefringence axis changes direction from being vertical inside the exposure spot to horizontal outside of it. This change of direction forces the birefringence magnitude close to the edge of the exposure spot to zero. This shows up as two distinct dips in the horizontal cross-section (positions at about 11 and 13 mm, respectively). The expected sharp drop to zero is somewhat masked by smoothing from the beam width of the birefringence measurement instrument.

A plurality of samples having different compositions (OH concentration, $H_2$ concentration, for example) and processing conditions ($H_2$ loading temperature, for example) were tested for polarization-induced birefringence when exposed to linearly polarized laser beam at various fluences and pulse numbers. Their polarization-induced birefringence behavior is reported in the diagram of FIG. 5. It is clear from this figure that for a great majority of the samples tested, and for the conditions and the limited number of pulses presented here, polarization-induced birefringence thereof appears to develop linearly with the number of exposing pulses. That is in stark contrast to the behavior of laser-induced wavefront distortion which is not linear and, for certain types of silica, may even exhibit sign changes.

Figure 5:
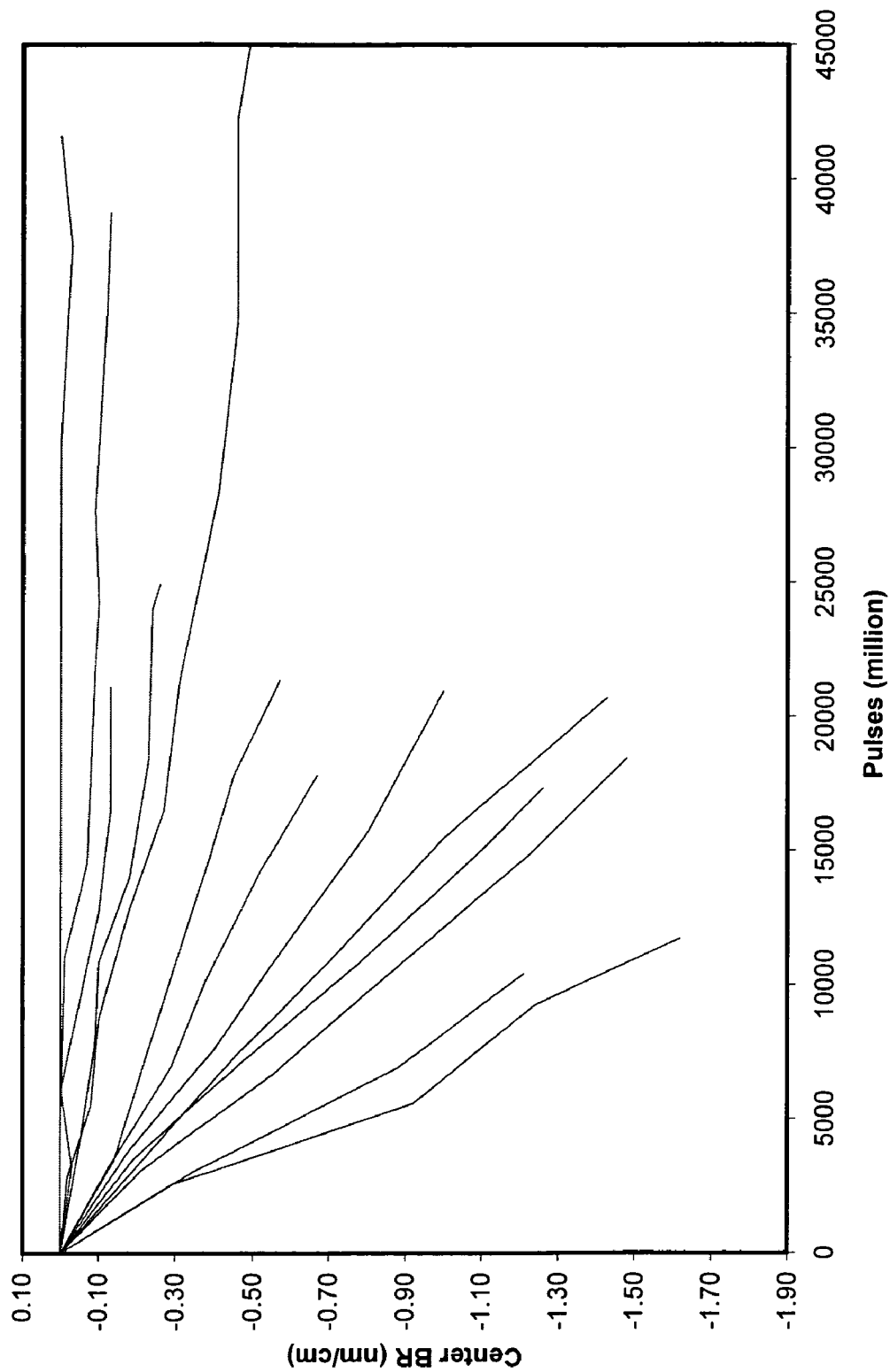
FIG. 5 is a diagram showing the measured center birefringence as a function of number of pulses at 193 nm of a plurality of synthetic silica glass samples having various OH concentrations, $H_2$ concentrations and $H_2$ loading temperature upon being exposed to linearly polarized excimer laser beams having pulse length of 25 ns and various fluences. Each line represents the behavior of a sample.
Figure 6:
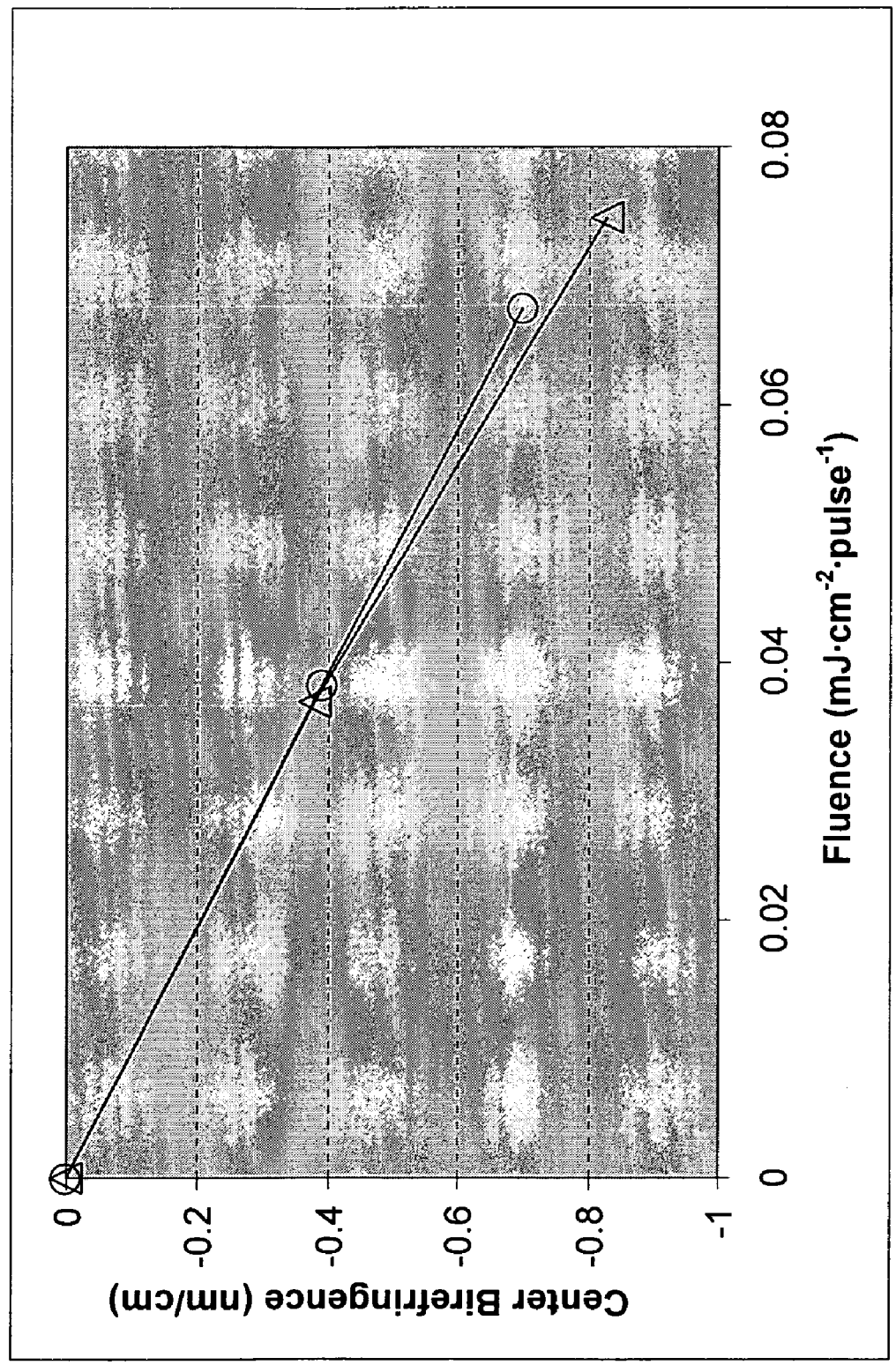
FIG. 6 is a diagram showing measured center birefringence as a function of fluence of laser beam of a plurality of synthetic silica glass samples upon being exposed to linearly polarized excimer laser beams having pulse length of 25 ns and various fluences. For each curve, the OH concentration, H₂ loading temperature and number of pulses are essentially the same.
Figure 7:
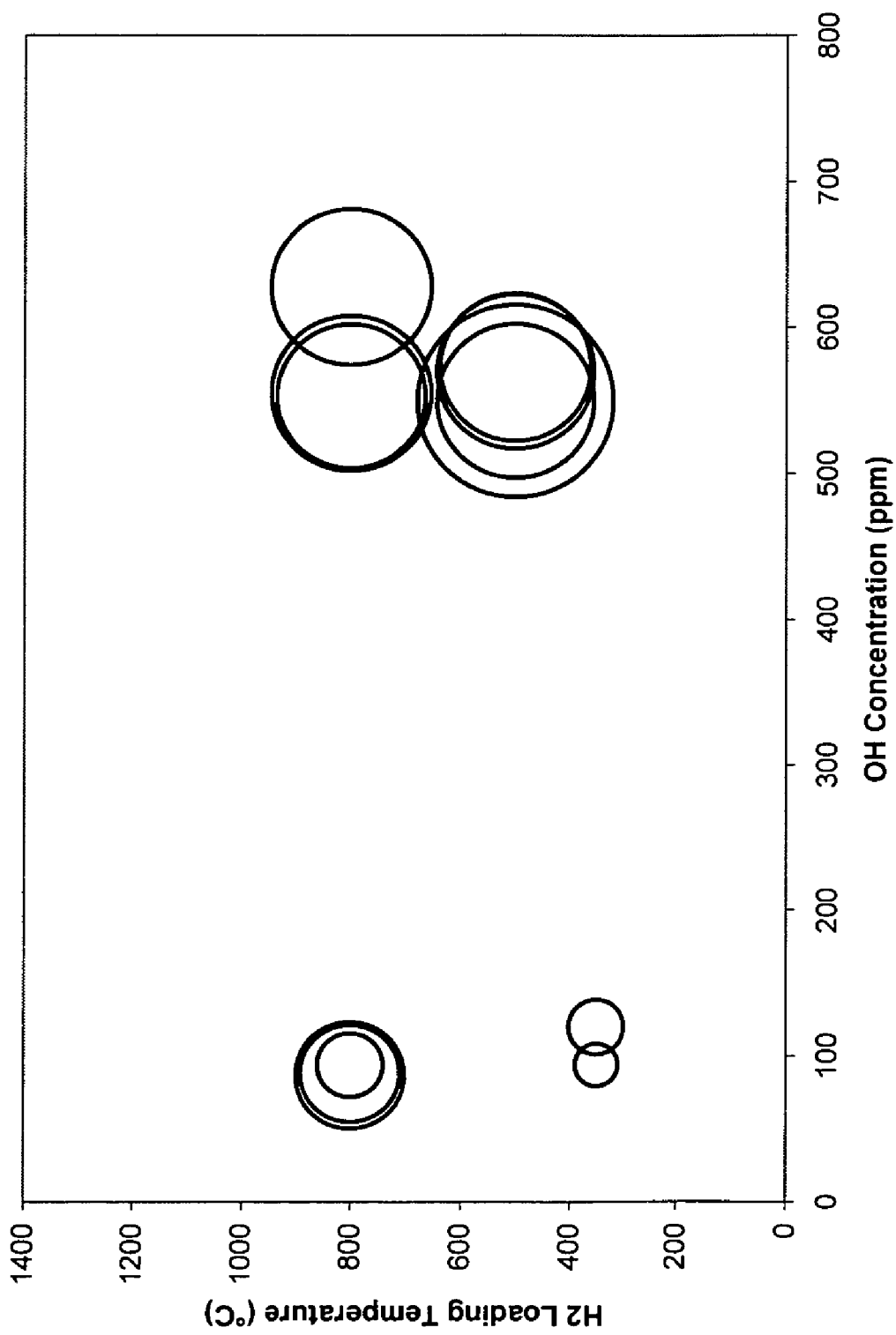
FIG. 7 is a diagram showing the impact on polarization-induced birefringence of H₂ loading temperature and OH concentration of a plurality of synthetic silica glass samples upon being exposed to linearly polarized excimer laser beams having pulse length of 25 ns and various fluences. The polarization-induced birefringence factor a in PIB=a·F·N are coded as symbol size of circles in this figure.
Figure 8:
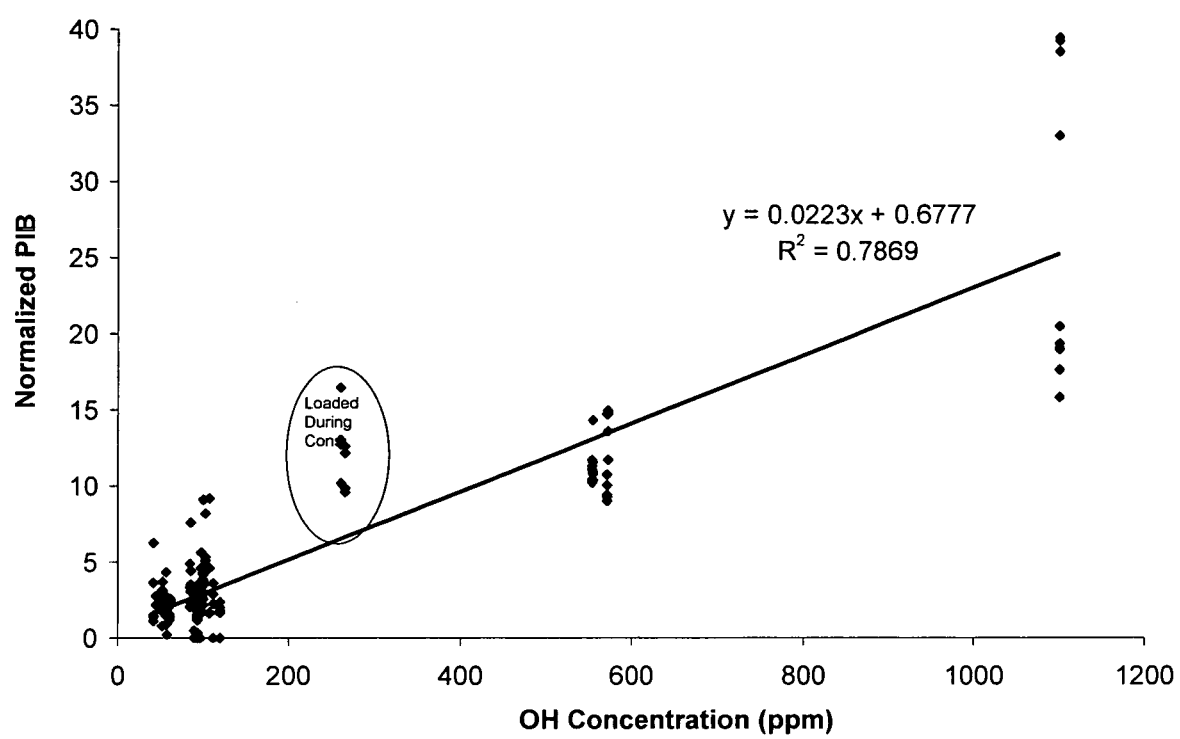
FIG. 8 is a diagram showing normalized polarization-induced birefringence as a function of OH concentration in the glasses of a plurality of synthetic silica glass samples.

FIG. 5 also suggests the polarization-induced birefringence value is linearly dependent on the fluence of the exposing light beam at a given laser pulse length. FIG. 5 does not directly show saturation of polarization-induced birefringence with exposure, but saturation has been observed at higher doses. FIG. 6 shows the polarization-induced birefringence value of certain samples having essentially the same composition and processing condition at a given number of pulse count as a function of the fluence of the light beam. Therefore, the relationship between polarization-induced birefringence, pulse number and fluence can tentatively be described as PIB=a·N·F with a being a sample-dependent factor, N being the number of pulses, F being the fluence and PIB being the level of polarization-induced birefringence. In FIG. 7 this factor is shown (coded as symbol size) vs. $H_2$ treatment temperature after consolidation and OH concentration in the glass for different samples. In FIG. 8, the data of certain samples in FIG. 5 are re-plotted in a normalized PIB-OH Concentration (ppm) diagram. From FIGS. 7 and 8, it is clear that the main driver of polarization-induced birefringence appears to be the OH concentration, whereas $H_2$ treatment temperature has less of an impact. The region of best performance is where both OH concentration and loading temperature are low on the scales shown in the figure. The behavior of some samples would linearly extrapolate to an end-of-life birefringence (200 billion pulses) of 1 nm/cm at a fluence of 40 $\mu J \cdot cm^{-2} \cdot pulse^{-1}$. This is at least a factor of 8 less than for the glasses reported in the prior art, and a factor of 10 better than a commercially available direct-to-glass silica glass.

Strain-Optical Interpretation

We interpret the permanent changes in optical properties brought about by excimer laser exposure in terms of glass strain and the strain-optical effect. Direct evidence for strain is given by the long-range strain field observed in the birefringence outside the aperture (in the unexposed glass) seen in, for example, FIG. 1. This is consistent with the $1/r^2$ strain field predicted by a plane strain model (or by finite element elastic analysis) when the exposed region shrinks. If the strain were isotropic, then the exposed region would be in a state of "drumhead tension" with equal strains (and equal stresses) perpendicular to the sample length. In this case the birefringence within the exposed region would vanish as seen experimentally in FIG. 1. Linearly polarized exposure produces a very substantial birefringence within the exposed region (FIG. 2) which clearly is inconsistent with only isotropic strain. It seems reasonable, however, to infer that the anisotropy of the linearly polarized radiation field produces permanent anisotropic strain in the glass. The anisotropic strain occurs in spite of the initial isotropy of the glass, and entirely as a result of the light field anisotropy. This is physically sensible because only two kinds of strain can occur by symmetry in response to linearly polarized light: one is simply isotropic, which is called herein an isotropic density change, and the second has a strain component only along the electric field direction. Formerly a strain theory with only a single "unconstrained" fractional density change $\delta\rho/\rho$ (call this D for simplicity) was considered, where, because of the linearity of both elastic response and strain-optical response, all results scaled with this single value. The unconstrained density change D was used previously to report laser damage of silica in a form independent of sample geometry. Now, in contrast, both D and an "unconstrained anisotropic strain" A are needed to fully characterize the strain and optical changes of an exposed sample. These two quantities can be related to the usual components of strain by the relations $$D \equiv \frac{\delta\rho}{\rho} = -(\varepsilon_{xx} + \varepsilon_{yy} + \varepsilon_{zz}) \quad (1)$$

and $$A \equiv (\varepsilon_{xx} + \varepsilon_{yy} - 2\varepsilon_{zz}) \quad (2)$$

where $\varepsilon_{ij}$ is a component of strain (gradient of displacement) and the coordinate axes are chosen to place z along the path of exposing light through the sample and x and y are along the ellipse axes for elliptical polarization. (Linear polarization is a special case of elliptical polarization; when elliptical polarization is being considered, then the individual strain components are different linear combinations of D and A depending on the ellipse shape. The definitions of D and A hold for arbitrary elliptical polarization.) Given values for D and A, which are typically of order $10^{-6}$ for laser damage studies, a finite element elastic analysis was performed to calculate the final elastic strains (and stresses) that result from the initial strains defined by D and A. That is, elastic analysis is needed in order to account for sample geometry and boundary conditions. In this step the actual illumination profile is incorporated. When the initial (unconstrained) and elastic strains are known, then the strain-optical formulation is used to calculate changes in the "impermeability tensor" $\Delta B$ given by $$\Delta B_{ij} = p_{ijkl}\Delta\varepsilon_{kl} + r_{ijkl}\varepsilon_{kl}^{0} \quad (3)$$

where $p_{ijkl}$ is the strain-optical tensor, $\Delta\varepsilon_{kl}$ are the elastic response strains that depend on the initial strains and the sample geometry and illumination profile, $r_{ijkl}$ is a separate strain-optical tensor associated with permanent strains, and $\varepsilon_{kl}^{0}$ are the initial or unconstrained strains that appeared in Eqs. (1) and (2). Summation over repeated indices is implied. The use of a special strain-optical tensor for permanent strains, as opposed to elastic strains, is needed based on the difference in optical response observed for permanent strains vs. elastic strains. While the strain-optical tensor $P_{ijkl}$ is well known in the literature and characterized for a range of wavelengths for silica, the permanent-strain strain-optical tensor $r_{ijkl}$ is less well established and is a subject of study. The impermeability tensor $B_{ij}$ is the inverse of the dielectric tensor. After projecting $\Delta B$ into the plane perpendicular to the measurement light path, its eigenvalues give the strain-optical change in index of refraction and birefringence, and its eigenvectors give the slow axis of birefringence. Because the elastic and strain-optical theories are both linear, a great simplification occurs and for a given sample geometry and illumination profile, all the analysis given above boils down to two simple relations $$\frac{\delta(nL)}{L} = aD + bA \quad (4)$$

and $$R = cD + dA \quad (5)$$

where a, b, c, and d are geometry—and illumination—dependent constants, $\delta(nL)/L$ is the change in optical path per unit length (the LIWFD mentioned above), and R is the magnitude of the birefringence. The constants a, b, c, and d vary from point to point on the sample face and depend on the exposing polarization. For example, for the case of linear polarization and in the center of the exposed region, the birefringence magnitude (polarization-induced birefringence or PIB) is given by $$PIB = d'A \quad (6)$$

where d' is used to distinguish the constant of proportionality from d. This gives the very useful result that PIB is directly proportional to unconstrained anisotropy A and completely independent of unconstrained density D. a, b, c, and d depend on the elastic properties (Young's modulus and Poisson ratio) and on the strain-optical constants $p_{ijkl}$ and the tensor $r_{ijkl}$. The latter two tensors only have two independent constants each in isotropic glass; these are denoted $p_{11}$ and $p_{12}$, and analogously $r_{11}$ and $r_{12}$. The presence of these strain-optical constants makes the linear coefficients a, b, c, and d also dependent on the wavelength of the measurement light.

Using literature values for $p_{11}$ and $p_{12}$, and using a reasonable guess for $r_{11}$ and $r_{12}$, for our sample geometry the value of A inferred from Eq. (2) in experimental measurements is always negative. This arises from our definition of A from Eq. (2), from our assumed values of the strain-optical constants, and from the experimental observation that the slow axis of PIB is always perpendicular to the exposing laser linear polarization. We see this for example for both compacting and expanding samples, i.e. for either sign of D.

It is worth repeating that circularly polarized exposure produces PIB=0. Elliptical polarization produces slightly more PIB and of course linear polarization produces the largest PIB. Any averaging over polarizations that tends to randomize the accumulated exposure polarization will reduce the PIB proportionately.

Comparison of Experimental Data with Model

Here the formalism described in the previous section ("Strain-Optical Interpretation") is used to fit experimental birefringence data. For that, the density change D and the anisotropy A are varied until the sum of least-square errors between experimental and calculated birefringence maps is minimized. This procedure characterizes the induced birefringence at a certain stage of exposure and shows how applicable is the assumption of anisotropic strain. Note that the entire two-dimensional map of birefringence magnitudes and slow axis directions is fit with a single pair of values (D, A). Modeling of the evolution of damage over the course of exposure is not attempted here.

Figure 9:
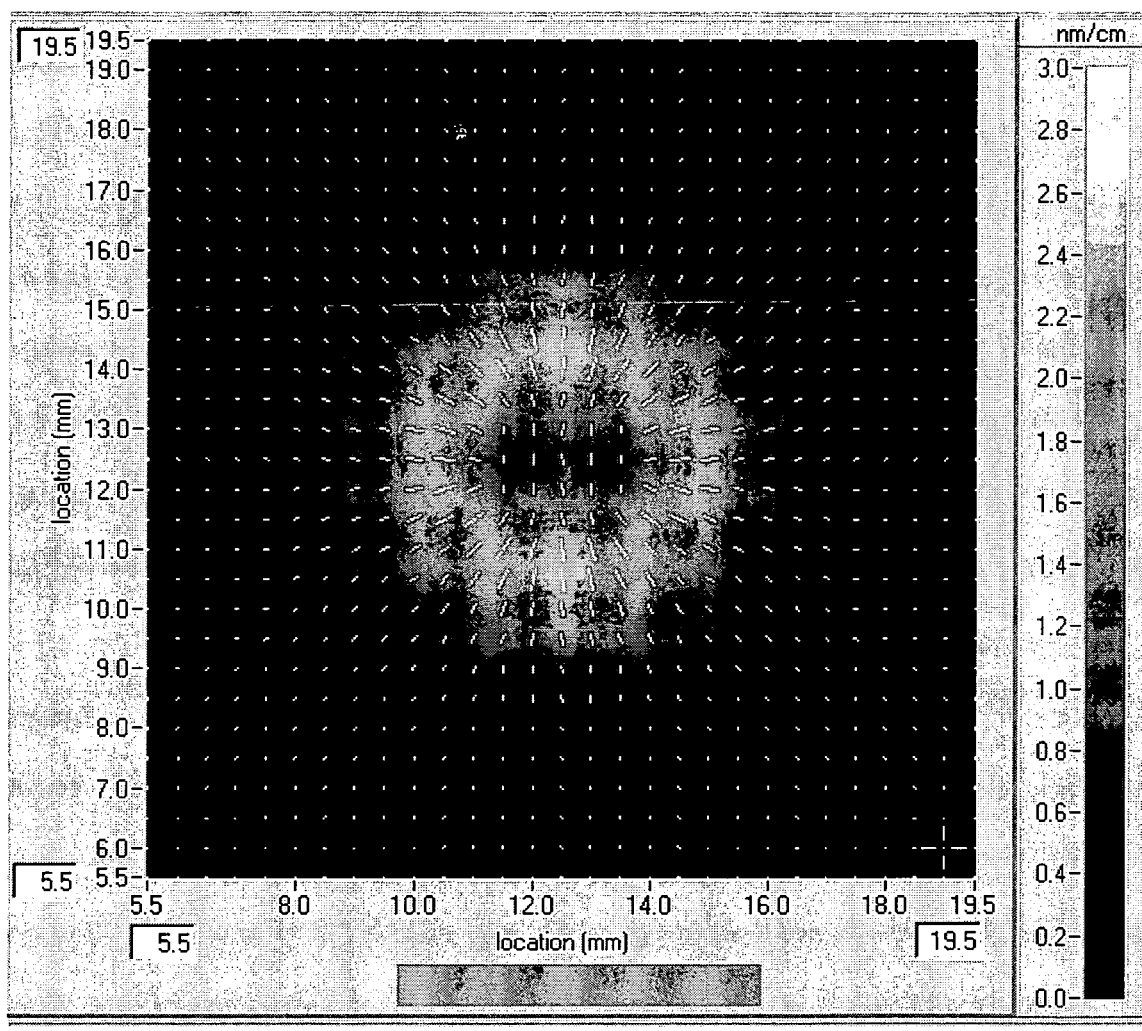
FIG. 9 is a calculated two-dimensional birefringence map by using the Strain-Optical Model and finite element analysis based on the same set of data in FIG. 3.
Figure 10:
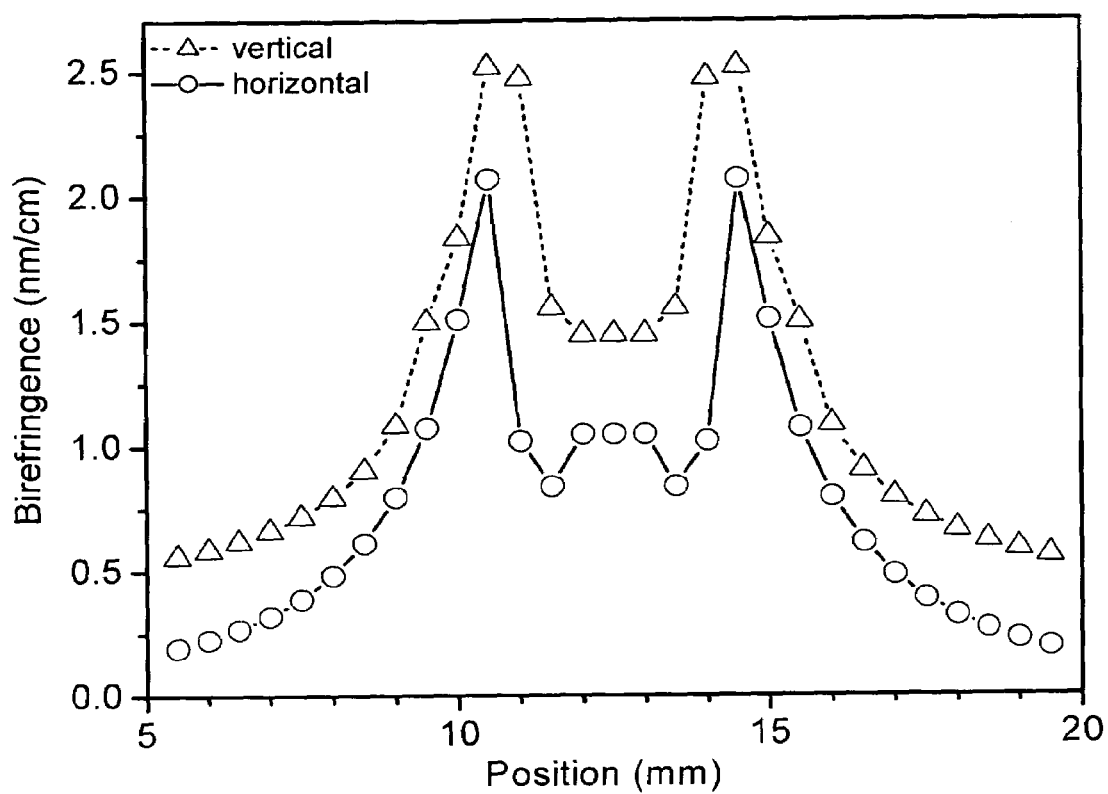
FIG. 10 is a diagram showing a horizontal cross-section and a vertical cross-section of the two-dimensional birefringence map of FIG. 9.

FIG. 9 shows calculated results in the form of a two-dimensional birefringence map as obtained from a fit to the experimental data from above in FIG. 3. All main features observed in the experimental data are well reproduced: the ring-shaped birefringence maximum, the radial pattern outside of the exposure spot, and the non-zero birefringence in the center of exposed region. Horizontal and vertical cross-sections of FIG. 9 are shown in FIG. 10. The horizontal cross-section shown in FIG. 10 exhibits the two dips close to the edge of the spot. Both the experimental as well as the calculated map suffer from the coarse grid which leads to under-sampling of the large gradients in the birefringence distributions, and from the smoothing associated with the beam width of the measuring laser. The model grid was chosen to agree with the limited spatial resolution of the measurement system (about 0.5 mm), and model calculated results include smoothing in proportion to the measured beam profile.

Figure 11:
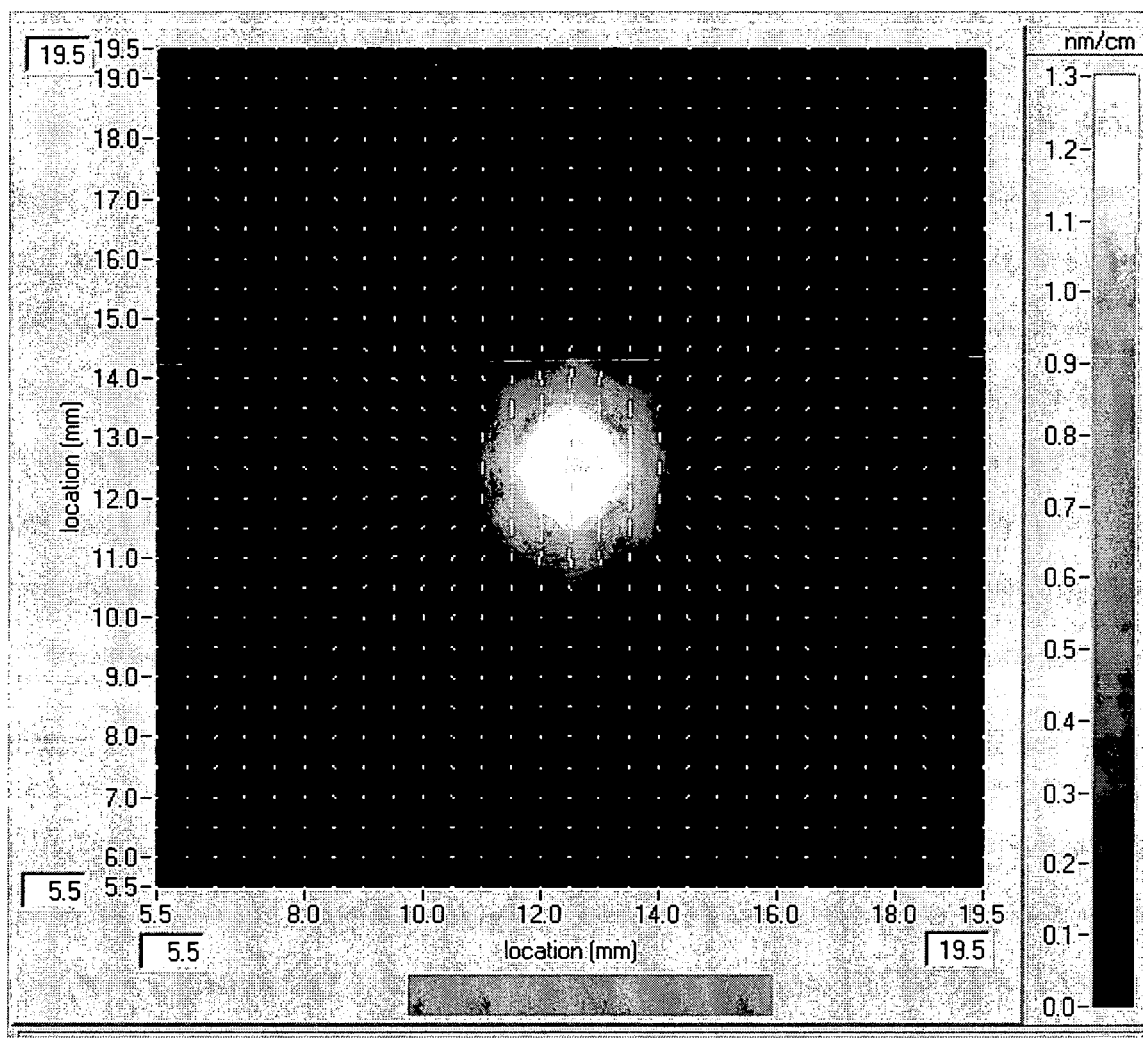
FIG. 11 is a calculated two-dimensional birefringence map by using the Strain-Optical Model and finite element analysis based on the set of data in FIG. 2.

FIG. 11 contains a fit to the experimental data from FIG. 2. This is a sample with dominant anisotropy and relatively small density change. As in the previous example, the experimental features are reproduced: the virtual absence of birefringence outside of the exposed area and the strong center birefringence with all the slow axes aligned vertically.

Here it is important to note if the polarization state of the lithographic irradiation, such as that of an immersion lithographic device of the present invention, is altered periodically, for example, from parallel to orthogonal position, the cumulative effect in terms of polarization-induced birefringence should decrease since polarization-induced birefringence actually starts to decrease as soon as, after initial exposure, the polarization is switched to the orthogonal polarization.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A synthetic silica glass material, the synthetic silica glass material consisting essentially of synthetic silica glass, $H_2$, and OH, wherein the synthetic silica glass optical material is loaded with $H_2$ at a temperature of less than 800° C., and wherein $H_2$ is present in a concentration greater than $1\times10^{16}$ molecules/cm$^3$ and less than $1\times10^{19}$ molecules/cm$^3$, and being capable of use in the light path of lithographic irradiation at below about 300 nm in lithographic devices, the synthetic silica glass material having less than about 1 nm/cm of polarization-induced birefringence at the center of the uniformly exposed area of the glass measured at about 633 nm after being subjected to $5\times10^9$ pulses of a linearly polarized pulsed laser beam at about 193 nm having a fluence of about 40 $\mu J \cdot cm^{-2} \cdot pulse^{-1}$ and a pulse length of about 25 ns.

2. A synthetic silica glass material according to claim 1, the synthetic silica glass material having less than about 0.1 nm/cm of polarization-induced birefringence at the center of the uniformly exposed area of the glass measured at about 633 nm after being subjected to $5\times10^9$ pulses of linearly polarized pulsed laser beam at about 193 nm having a fluence of about 40 $\mu J \cdot cm^{-2} \cdot pulse^{-1}$ and a pulse length of about 25 ns.

3. A synthetic silica glass material according to claim 2, the synthetic silica glass material having higher than about 0.01 nm/cm of polarization-induced birefringence measured at the center of the uniformly exposed area of the glass at about 633 nm after being subjected to $2\times10^{10}$ pulses of linearly polarized pulsed laser beam at about 193 nm having a fluence of about 40 $\mu J \cdot cm^{-2} \cdot pulse^{-1}$ and a pulse length of about 25 ns.

4. A synthetic silica glass material according to claim 1, the synthetic silica glass material having less than about 0.1 nm/cm of polarization-induced birefringence measured at about 633 nm after being subjected to $1\times10^{10}$ pulses of linearly polarized pulsed laser beam at the center of the uniformly exposed area of the glass at about 193 nm having a fluence of about 40 $\mu J \cdot cm^{-2} \cdot pulse^{-1}$ and a pulse length of about 25 ns.

5. A synthetic silica glass material according to claim 1, the synthetic silica glass material having less than about 0.1 nm/cm of polarization-induced birefringence at the center of the uniformly exposed area of the glass measured at about 633 nm after being subjected to $2\times10^{10}$ pulses of linearly polarized pulsed laser beam at about 193 nm having a fluence of about 40 $\mu J \cdot cm^{-2} \cdot pulse^{-1}$ and a pulse length of about 25 ns.

6. A synthetic silica glass material according to claim 5, the synthetic silica glass material having less than about 0.04 nm/cm of polarization-induced birefringence at the center of the uniformly exposed area of the glass measured at about 633 nm after being subjected to $2\times10^{10}$ pulses of linearly polarized pulsed laser beam at about 193 nm having a fluence of about 40 $\mu J \cdot cm^{-2} \cdot pulse^{-1}$ and a pulse length of about 25 ns.

7. A synthetic silica glass material according to claim 1, the synthetic silica glass material having higher than about 0.01 nm/cm of polarization-induced birefringence at the center of the uniformly exposed area of the glass measured at about 633 nm after being subjected to $2\times10^{10}$ pulses of linearly polarized pulsed laser beam at about 193 nm having a fluence of about 40 $\mu J \cdot cm^{-2} \cdot pulse^{-1}$ and a pulse length of about 25 ns.

8. A synthetic silica glass material according to claim 1, wherein the glass, when exposed to linearly polarized pulsed laser irradiation, has a polarization-induced birefringence at the center of the uniformly exposed area of the glass that is approximately linearly dependent on the number and fluence of the pulses at a given pulse length before saturation of polarization-induced birefringence in the exposed area.

9. A synthetic silica glass material according to claim 1, the synthetic silica glass material having an OH concentration of less than about 500 ppm by weight.

10. A synthetic silica glass material according to claim 1, wherein the synthetic silica glass material has an initial birefringence of less than 5 nm/cm measured at 633 nm before being exposed to a linearly polarized pulsed laser beam.

11. A synthetic silica glass material according to claim 1, wherein the synthetic silica glass material has an edge induced birefringence of less than 0.5 nm/cm after being subjected to $5\times10^{10}$ pulses of a linearly polarized pulsed laser beam at about 193 nm having a fluence of about 40 $\mu J \cdot cm^{-2} \cdot pulse^{-1}$ and a pulse length of about 25 ns.

12. A synthetic silica glass material according to claim 11, wherein the synthetic silica glass material has an edge induced birefringence of less than 0.5 nm/cm after being subjected to $1\times10^{11}$ pulses of a linearly polarized pulsed laser beam at about 193 nm having a fluence of about 40 $\mu J \cdot cm^{-2} \cdot pulse^{-1}$ and a pulse length of about 25 ns.

13. A synthetic silica glass material according to claim 11, wherein the synthetic silica glass material has an edge induced birefringence of less than 0.5 nm/cm after being subjected to $2\times10^{11}$ pulses of a linearly polarized pulsed laser beam at about 193 nm having a fluence of about 40 $\mu J \cdot cm^{-2} \cdot pulse^{-1}$ and a pulse length of about 25 ns.

14. A synthetic silica glass material according to claim 1, wherein the synthetic silica glass material comprises less than 50 ppm Cl.

15. A synthetic silica glass material, the synthetic silica glass material consisting essentially of synthetic silica glass, $H_2$, and OH, wherein the synthetic silica glass optical material is loaded with $H_2$ at a temperature of less than 800° C., and wherein $H_2$ is present in a concentration greater than $1\times10^{16}$ molecules/cm$^3$ and less than $1\times10^{19}$ molecules/cm$^3$, and being capable of use in the light path of lithographic irradiation at below about 300 nm in lithographic devices, wherein the glass, when exposed to linearly polarized pulsed laser irradiation at about 193 nm, has a polarization-induced birefringence at the center of the uniformly exposed area of the glass that approximately meets the following equation:

$$PIB = a \cdot F \cdot N,$$

where PIB is polarization-induced birefringence measured at about 633 nm, F is fluence of the 193 laser irradiation, N is pulse number in the million, and a $<5.0\times10^{-7}$ cm$^2 \cdot \mu J^{-1}$.

16. A synthetic silica glass material, the synthetic silica glass material consisting essentially of synthetic silica glass, $H_2$, and OH, wherein the synthetic silica glass optical material is loaded with $H_2$ at a temperature of less than 800° C., and wherein $H_2$ is present in a concentration greater than $1\times10^{16}$ molecules/cm$^3$ and less than $1\times10^{19}$ molecules/cm$^3$, and having a normalized polarization-induced birefringence at the center of the uniformly exposed area of the glass that is measured at 633 nm of less than 10 nm/cm when exposed to linearly polarized pulsed laser irradiation at about 193 nm.

17. A method for producing a synthetic silica glass material with an $H_2$ concentration greater than $1\times10^{16}$ molecules/cm$^3$ and less than $1\times10^{19}$ molecules/cm$^3$ capable of being used in the light path of the lithographic irradiation below about 300 nm of a lithographic device having a low level of polarization-induced birefringence upon exposure to linearly polarized irradiation at about 193 nm, comprising the following steps:
  (i) providing a high purity consolidated synthetic silica glass material having OH concentration of less than about 500 ppm by weight; and
  (ii) treating the consolidated synthetic silica glass in the presence of $H_2$ at a temperature below 800° C., at least if the consolidated glass provided in step (i) has an $H_2$ concentration of less than $1\times10^{16}$ molecules/cm$^3$, wherein the consolidated synthetic silica glass consists essentially of synthetic silica glass, $H_2$, and OH, and has less than about 1 nm/cm of polarization-induced birefringence at the center of the uniformly exposed area of the glass measured at about 633 nm after being subjected to $5\times10^9$ pulses of a linearly polarized pulsed laser beam at about 193 nm having a fluence of about 40 $\mu J \cdot cm^{-2} \cdot pulse^{-1}$ and a pulse length of about 25 ns.

18. A method according to claim 17, wherein in step (i), the high purity consolidated synthetic silica glass material is formed by using the soot-to-glass process.

19. A method according to claim 18, wherein step (i) comprises the following steps:
  (A) forming a silica soot preform;
  (B) drying the silica soot preform with a drying agent; and
  (C) consolidate the dried silica soot preform in the presence of an atmosphere containing $H_2O$ at a controlled partial pressure thereof.

20. A method according to claim 19, wherein in step (B), the drying agent is selected from $Cl_2$, $Br_2$, halogen-containing compounds, CO, $CO_2$ and compatible mixtures thereof.

21. A method according to claim 19, wherein immediately after drying in step (B), the OH concentration in the soot preform is less than about 0.1 ppm by weight.

22. A method according to claim 19, wherein immediately after step (C), the OH concentration in the consolidated glass is less than or equal to 50 ppm by weight.

23. A method according to claim 19, wherein in step (C), the atmosphere in which the soot preform is consolidated further comprises $O_2$.

24. A method according to claim 19, wherein in step (C), the atmosphere in which the soot preform is consolidated further comprises $H_2$.

25. A method according to claim 18, wherein step (i) comprises the following steps:
  (A1) forming a silica soot preform; and
  (B1) drying the silica soot preform with a dry inert gas at an elevated temperature to an OH concentration of over about 40 ppm by weight.

26. A method according to claim 17, wherein in step (ii), the consolidated synthetic silica glass is treated in the presence of $H_2$ at a temperature above 300° C.

27. A method according to claim 17, wherein before step (ii), the consolidated synthetic silica glass has an $H_2$ concentration of lower than about $1\times10^{16}$ molecules/cm$^3$.

28. An immersion lithography device comprising at least one optical element in the light path of the lithographic irradiation made of the glass material of claim 1.

29. An immersion lithography device according to claim 28, wherein the lithographic irradiation is linearly or elliptically polarized.

30. An immersion lithography device according to claim 28, wherein the lithographic irradiation is linearly polarized.

31. An immersion lithography device according to claim 28, wherein the lithographic irradiation has a wavelength of about 248 nm.

32. An immersion lithography device according to claim 28, wherein the lithographic irradiation has a wavelength of about 193 nm.

* * * * *